L. KOSSOY.
ELECTRIC CUT-OUT BOX.
APPLICATION FILED JUNE 29, 1916.
1,219,468.
Patented Mar. 20, 1917.
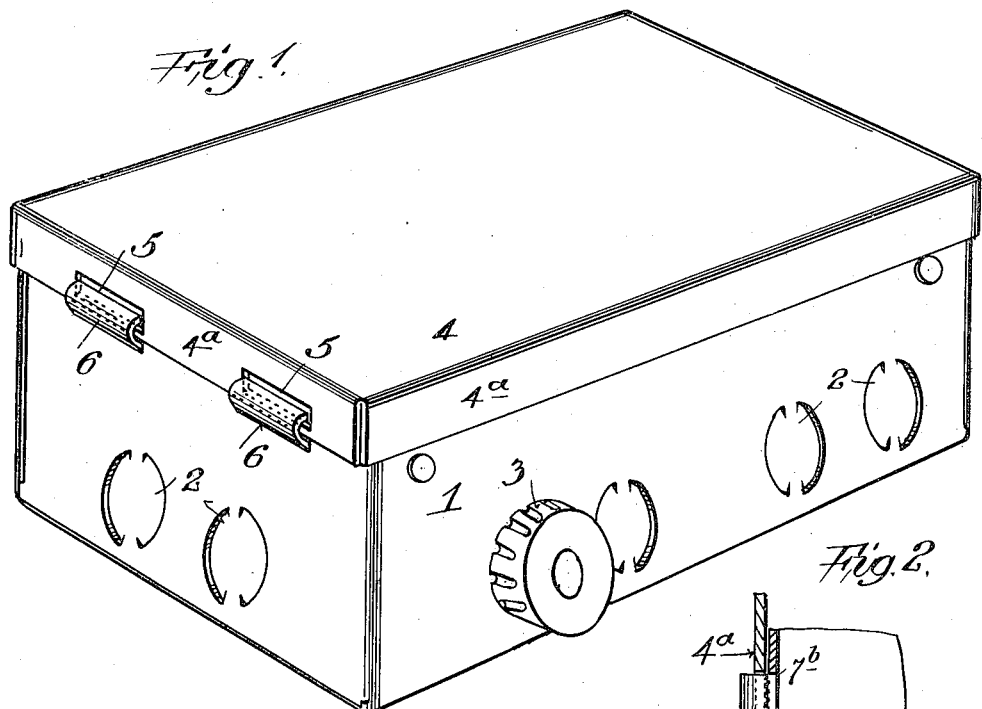
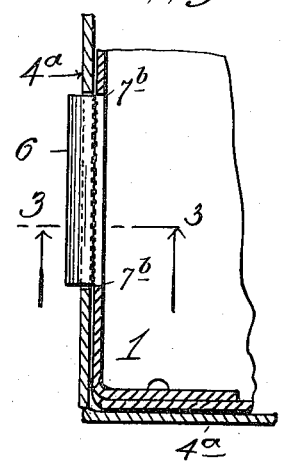
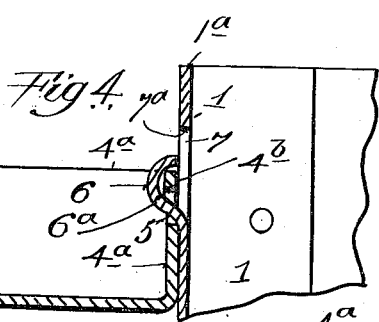
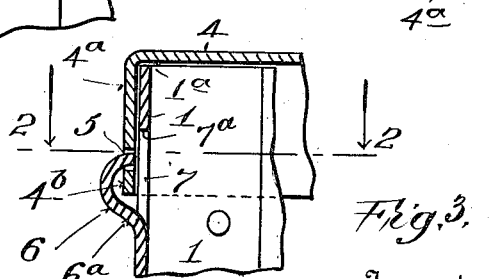
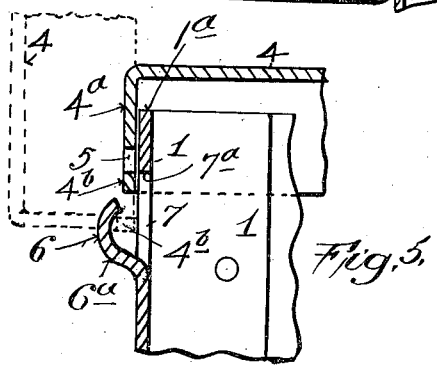
Inventor
Louis Kossoy
By his Attorney
T. F. Bourne

UNITED STATES PATENT OFFICE.

LOUIS KOSSOY, OF NEW YORK, N. Y.

ELECTRIC CUT-OUT BOX.

1,219,468.   Specification of Letters Patent.   Patented Mar. 20, 1917.

Application filed June 29, 1916.   Serial No. 106,572.

*To all whom it may concern:*

Be it known that I, LOUIS KOSSOY, a subject of the Czar of Russia, and resident of New York city, borough of the Bronx, in the county of Bronx and State of New York, have invented certain new and useful Improvements in Electric Cut-Out Boxes, of which the following is a specification.

The object of my invention is to hinge covers on boxes in a simple, cheap and durable manner, whereby the cover may swing freely with respect to the box, will not be liable to become detached from the hinge member of the box, nor to injure the same when the cover is swung back and forth, and whereby the cover will be firmly retained by its hinge when closed.

My invention comprises novel details of improvement and combinations of parts that will be more fully hereinafter set forth and then pointed out in the claims.

Reference is to be had to the accompanying drawings forming part hereof, wherein, Figure 1 is a perspective view of an electric cutout box embodying my invention;

Fig. 2 is an enlarged transverse section of a portion of the box through one of the hinge portions, substantially on the line 2, 2, in Fig. 3;

Fig. 3 is a section on the line 3, 3, in Fig. 2;

Fig. 4 is a view similar to Fig. 3 illustrating the cover opened, and

Fig. 5 is a sectional detail illustrating steps in applying the cover to the hinge member of the box.

Similar numerals of reference indicate corresponding parts in the several views.

The numeral 1 indicates a box, which may be made of suitable metal and is shown provided with knockouts at 2, whereby electric fittings, such as bushings 3, may be applied to the box in any well known manner. At 4 is a cover for the box shown provided with a flange $4^a$ depending around the margin of the open side of the box. One portion of the flange $4^a$ of the cover is provided with one or more slots 5 spaced from the edge of the flange for receiving the complemental tongue or hinge member 6 on the adjacent wall of the box. The tongue 6 may be formed by providing slits in a wall of the box at 7, the slits extending transversely at $7^a$ and thence parallel at $7^b$ toward the bottom of the box, the tongue at its inner part being integral with the box wall, and free at its outer end. The tongue 6 is pressed outwardly and bent to receive the corresponding slot 5 of the cover. The tongue is so formed as to project upwardly or toward the rim $1^a$ of the box wall, whereby to receive the slot 5 of the flange $4^a$. When the tongue 6 has been pushed outwardly and bent, the flange of the cover may be placed in the position illustrated in full lines in Fig. 5, and may be moved toward the box to cause the slot 5 to be opposite the free end of the tongue, and then the cover may be swung open so that the tongue will pass through the slot 5 of flange $4^a$, as illustrated in dotted lines in said figure, and with the parts in such position the tongue may be squeezed or pushed toward the box wall to loosely confine the part $4^b$ of the flange between the box wall and the tongue. The tongue will be so shaped as to permit the portion $4^b$ of flange $4^a$ to swing freely between the tongue and the box wall, whereby the cover may be closed, as illustrated in Fig. 3, and may be swung open as illustrated in Fig. 4, in which position the tongue will retain the cover securely on the box.

My improvements are simple in construction and cheap to manufacture, and afford a box having an integral hinge tongue, the lower portion $6^a$ of which serves as a seat for the hinge portion $4^b$ of the cover to rest on when the cover is open, thereby permanently retaining the flange of the cover in operative position on the tongue member. The construction described overcomes danger of the part $4^b$ of the cover slipping between the free edge of a tongue and the wall of a box when the cover is open, whereby, when the cover is next closed, the part $4^b$ of the flange would tend to engage the free end of the tongue and bend it outwardly, thereby disconnecting the hinge members. Furthermore, by means of my improvements, it is merely necessary to push or press the tongue outwardly, but without requiring the same to be coiled through the slot of the flange $4^a$, since by merely bending the tongue, as illustrated, to receive the slot 5, the tongue may be readily squeezed back toward the box wall without coiling said tongue, thereby reducing danger of cracking or breaking the tongue, reducing the cost of manufacture, and affording a secure hinge for the cover, since the cover will not become detached from or injure the tongue when the cover is operated.

It will be observed that, in the form of my invention illustrated, the slot 5 is located within the adjacent straight edge of flange 4ª of the cover, whereby the strength of the flange is retained and the cost is reduced, since it is merely necessary to stamp the slots of the flange out of straight edged stock, without requiring the use of cutting devices to form a slotted tongue on the flange.

While I have illustrated the cover connected to the box by two hinge members, it will be understood that one or more such hinge members may be provided on a box as desired.

Having now described my invention what I claim is:—

1. A box of the class described having a tongue formed integral with the wall of the box and having its free end extending toward the edge of the open side of the box, combined with a cover having a flange to extend along the box wall and provided with a slot, the tongue extending into the slot and having its free end located adjacent to the box wall to retain the cover pivotally on the box.

2. A box of the class described having a tongue bent outwardly from a wall of the box and curving toward the edge of the open side of the box, the lower part of the tongue being integral with the box wall and the free edge of the tongue extending toward the box wall above the connection of the tongue therewith, combined with a cover having a flange to fit along the box wall, the flange being provided with a slot receiving the bent portion of the tongue, the free end of the tongue opposing the flange adjacent to its slot when the cover is closed, the portion of the tongue connected to said wall supporting said portion of the flange when the cover is open.

3. A box of the class described having a curved tongue bent outwardly from a wall of the box and having its free end extending toward the edge of the open side of the box providing a space between the tongue and the box wall, combined with a cover having a flange to extend along the box wall, said flange having a slot receiving said tongue, said flange having a portion 4ᵇ located in said space between the tongue and the box wall adapted to engage the free end of the tongue when the cover is closed and to rest upon the tongue adjacent its junction with said wall when the cover is open.

Signed at New York city, in the county of New York, and State of New York, this 28th day of June, A. D. 1916.

LOUIS KOSSOY.

Witnesses:
T. F. BOURNE,
MARIE F. WAINRIGHT.